Patented July 27, 1937

2,087,981

UNITED STATES PATENT OFFICE 2,087,981

MANUFACTURE OF ARTIFICIAL THREADS AND OTHER PRODUCTS FROM CELLULOSE

Leon Lilienfeld, Vienna, Austria

No Drawing. Application June 27, 1930, Serial No. 464,425. In Austria July 15, 1929

48 Claims. (Cl. 18—54)

This invention is a modification of that described in my U. S. patent application Ser. No. 435,649, now Patent 2,021,862.

In said application is described a process of making artificial materials, for example artificial silk, by mixing a halohydrin of a polyhydroxylic alcohol, (e. g. alpha monochlorhydrin or ethylene bromhydrin) with viscose, and thereafter forming the product of this step into an artificial material (e. g. thread) and treating the latter (either with or without preliminary coagulation by dilute acids, acid salts and the like) with a plasticizing bath such as sulphuric acid of at least 35%, preferably under some tension, and finally washing, drying and the like.

The products have good luster, high wet and dry tenacity, and a considerable degree of elasticity.

My present invention is based upon my observation that the technical advance described in the aforesaid application can also be obtained by bringing together viscose or a derivative thereof, for example a compound of cellulose xanthic acid, with a monohalogen fatty acid, then giving a solution of the product thus obtained the form of an artificial material or thread, and treating the latter with one or more agents which have the property of coagulating the formed solution and of plasticizing the coagulated artificial material or thread. In this modification of the process of the aforesaid application it is also advantageous to use a strong mineral acid, in particular strong sulphuric acid, for example a setting bath which contains not less than 35 per cent and preferably not less than 50 per cent of $H_2SO_4$ or an equivalent quantity of another strong mineral acid.

As in the process described in the application Ser. No. 435,649, also in the present process, the coagulating and plasticizing may take place either in one setting bath having a plasticizing action upon the coagulated artificial material, or in two setting baths, the first of which has only a coagulating effect on the shaped solution whilst the second has a plasticizing effect on the freshly coagulated artificial material, for example thread. As a matter of course, in the two-bath modification (for instance, if a solution of a salt, such as ammonium sulphate or a weak acid solution or any other bath which imperfectly coagulates the shaped solution is employed) the second bath will not only plasticize, but also complete the coagulation of the artificial material.

Many indications make it probable that the action of the monohalogen fatty acid consists in the introduction of the respective hydroxycarboxylic acid residue, for example a glycollic acid residue, into the cellulose component of the cellulose xanthate or of another cellulose compound containing the CSS-group. In other words, there seems to take place an ether-like union of the cellulose component of the cellulose xanthate or derivative of cellulose xanthate with the oxycarboxylic acid, that is to say formation of oxycarboxylic acid ethers of cellulose, for example glycollic acid ethers of cellulose; and the monohydroxycarboxylic acid residue substituted for one or more of the hydroxylhydrogens of the cellulose component of the cellulose xanthate or other cellulose derivative containing the CSS-group, appears in the present modification of the process to play the part of the groups or radicals imparting elasticity.

As alternative (see U. S. application Ser. No. 435,649, with regard to radicals of di- or polyhydric alcohols), it is also possible that in the present process, the replacement of one or more hydroxyl hydrogen atoms of the cellulose component of the cellulose xanthate by one or more oxycarboxylic acid residues occurs simultaneously with, or subsequently to the attachment of the latter residues to the CSS-group of the cellulose xanthate (cellulose-xantho-fatty acid reaction, see my U. S. patent specification No. 1,642,587).

While the products of the reaction underlying the present invention are spoken of as oxycarboxylic acid ethers of cellulose or as cellulose xantho-fatty acids or both, it is not desired to limit this invention to any chemical definitions or formulae, since, while I believe that the products are compounds or derivatives of the types mentioned, the final composition of the products is not definitely known.

Whatever this composition may be, the important technical fact remains that by the present invention artificial materials, particularly artificial threads, are obtained which have in addition to high tenacity in dry and wet condition a good extensibility.

The process is carried out like that of the aforesaid specification, the single distinction being that instead of the halogen derivative of a di- or polyhydric alcohol, a halogen fatty acid or a salt or derivative (for example ester) thereof is used. These are hereinafter embraced in the term "halogen fatty acid compound".

In view of the circumstance that the practice of the process of the aforesaid specification is exactly as set forth in the latter and explained by aid of a large number of examples it appears unnecessary here to repeat all the there given particulars relating to the carrying out of the process and all the details of those numerous examples. Accordingly the number of examples is limited to that which appears directly necessary. In these examples, to which, however, the invention is not limited, the parts are by weight:—

*Example I (a) to (e)*

(a) 100 parts of wood pulp (water content=8 per cent) or cotton linters (water content=6 to 7 per cent) are introduced into 2000 parts of caustic soda lye of 18 per cent strength at 15° C. and allowed to remain therein for 3 hours; the alkali cellulose is then pressed until, in the case of wood pulp it weights 300 parts and in the case of linters 340 parts, and is then comminuted at 11–15° C. during 2½–3 hours; in the case of wood pulp 40 parts, and in the case of linters 60 parts of carbon disulphide are added and the carbon disulphide is allowed to act for 8 hours at 18–20° C.; any excess of carbon disulphide is then blown off during 10–15 minutes and the xanthate thus obtained is dissolved by using so much caustic soda and water that the solution obtained contains about 6.5 per cent of cellulose determinable analytically and 8 per cent of NaOH.

When dissolution is complete, 60 parts of monochloracetic acid, dissolved in 60 parts of water and neutralized with sodium bicarbonate are added to the viscose, and the mixture is thoroughly stirred and then left to itself at 15° C. The spinning solution is filtered 3 times through cotton, two filtrations having been performed soon after the addition of the chloracetic acid while the third occurs immediately before the spinning operation. The spinning solution thus obtained is now allowed to mature before the spinning for 96–100 hours at 15° C. and then spun in the following manner:—

The spinning solution is pressed at a speed of 1.6 ccm. per minute through a platinum nozzle, which contains 100 perforations of 0.08 mm. diameter into a bath which contains 57.5 per cent of $H_2SO_4$ and has a temperature of 16° C., the length of immersion of the threads in the sulphuric acid being 20 cm.; then the threads are allowed to pass through the air a distance of 165 cm. and wound on a spool revolving at such a speed that the threads are spun at the rate of about 18 metres per minute. During their passage through the air, the threads pass over three glass rollers arranged at an angle to each other so as to impart additional stretch or draught to the threads. The lower part of the bobbin runs in water so that the sulphuric acid is separated or considerably diluted as soon as the threads arrive at the bobbin. The threads are then washed, purified, dried, twisted and finished in the usual manner.

(b) The mode of operation is the same as in (a) but with the modification that 6.6 ccm. of the spinning solution are discharged per minute, that the speed of spinning is 40 metres per minute and that the precipitating bath contains 58 per cent of $H_2SO_4$.

(c) The process is conducted as in (a) but with the difference that 3.3 ccm. of the spinning solution are discharged per minute, that the setting bath contains 62 per cent of $H_2SO_4$ and has a temperature of 0° C., and that the spinning nozzle has 54 perforations of 0.1 mm. diameter.

(d) The operation is the same as in (a) but with the difference that 3 ccm. of spinning solution are discharged per minute, that the nozzle contains 24 perforations of 0.1 mm. diameter, that the precipitating bath contains 58 per cent of $H_2SO_4$ and has a temperature of 0° C., and that the length of immersion of the thread in the bath is 80 cm.

(e) Mode of procedure as in (b), but with the difference that the spinning solution is discharged at a speed of about 14 ccm. per minute, that the speed of spinning is 120 m. per minute, and that the thread is not given an additional stretching.

It will be observed that in this example, when the monochloracetic acid is neutralized with sodium bicarbonate, it is thereby converted into a salt which is water soluble, namely into the sodium salt, which is the most common of the alkali metal salts. This example is accordingly typical of the above statement that a salt of a halogen fatty acid can be used. Here the chloracetic acid is added in the form of its sodium salt.

Chloracetic acid is $ClCH_2\text{-}COOH$. Its sodium salt is $ClCH_2\text{-}COONa$ and the characteristic radical of these compounds is $ClCH_2COO-$. The characteristic radical of monohalogen monocarboxylic fatty acids is $H_aC_nH_{2n}COO-$ (in which $H_a$ indicates a halogen atom).

*II (a) to (e)*

The process is conducted as in any one of the Examples I (a) to (e), but with the difference that, instead of 60 parts, 50 parts of monochloracetic acid are employed and that the reaction mixture resulting from the addition of the monochloracetic acid to the viscose is stirred for about 3 to 4 hours every day before spinning.

The strength of the spinning acids is as follows:

Spinning method (a) 60 to 61 per cent of $H_2SO_4$
Spinning method (b) 63 to 66 per cent of $H_2SO_4$
Spinning method (c) 65 to 67 per cent of $H_2SO_4$
Spinning method (d) 63 to 64 per cent of $H_2SO_4$

*III (a) and (b)*

(a) The manufacture of the viscose differs from that described in Example I only in that there is used for the dissolution of the cellulose xanthate so much caustic soda and water that the solution obtained contains about 6.5 per cent of cellulose analytically determined and 5 per cent of NaOH.

When dissolution is complete 40 parts of monochloracetic acid dissolved in 40 parts of water and neutralized with sodium bicarbonate are added to the viscose and thoroughly stirred in. The spinning solution is then filtered three times through cotton, two of the filtrations occurring soon after the addition of the chloracetic acid, while the third occurs immediately before spinning. The spinning solution thus obtained is allowed to mature before spinning for 96–100 hours at 15° C. and then spun as follows:—

The spinning solution is forced at a speed of 3.3 ccm. per minute through a platinum nozzle, which contains 24 perforations of 0.1 mm. diameter, into a bath containing 58 per cent of $H_2SO_4$ and at a temperature of 0° C. the length of immersion of the threads in the sulphuric acid being 80 cm. After leaving the bath, the threads are allowed to travel through the air a distance of at least 165 cm. and are wound up on a bobbin revolving at such a speed that about 18 metres of the threads are spun per minute. An additional stretch is not given to the threads. The lower part of the spool runs in water, so that the sulphuric acid is separated or considerably diluted as soon as the threads arrive at the bobbin. The threads are then washed, purified, dried, twisted and finished in the usual manner.

(b) The operation is the same as in (a) but with the difference that 6.6 ccm. of the spinning solution are discharged per minute, that the nozzle has 100 perforations of 0.08 mm. diameter, that the speed of spinning is 40 metres per minute and that the precipitating bath contains 59 per cent of $H_2SO_4$.

IV (a) to (f)

(a) The viscose is prepared exactly as in Example II.

When the dissolution of the viscose is complete 30 parts of monochloracetic acid dissolved in 30 parts of water and neutralized with sodium bicarbonate are added to the viscose and thoroughly stirred in. The thus obtained spinning solution is allowed to age for 96 to 100 hours at 15° C., during which time it is stirred for about 4 hours every day. The solution is filtered as described in the preceding examples and after the aforesaid 96 hours is spun as follows:

The spinning solution is forced at a speed of 1.6 ccm. per minute through a platinum nozzle, which contains 100 perforations of 0.08 mm. diameter into a bath containing 61 to 63 per cent of $H_2SO_4$ and having a temperature of 16° C., the length of immersion of the threads in the sulphuric acid being 20 cm. After leaving the bath the threads are allowed to travel through the air at a distance of 165 cm. and wound on a bobbin revolving at such a speed that the threads are spun at the rate of about 18 metres per minute. During their passage through the air, the threads pass over three glass rollers arranged at an angle to each other so as to impart additional stretch or draught to the threads. The lower part of the bobbin runs in water so that the sulphuric acid is separated or considerably diluted as soon as the threads arrive at the bobbin. The threads are then washed, purified, dried, twisted and finished in the usual manner.

(b) The mode of operation is the same as in (a) but with the modification that 3 ccm. of the spinning solution are discharged per minute and that the speed of spinning is 30 metres per minute.

(c) The mode of procedure is the same as in (a), but with the difference that 6.6 ccm. of the spinning solution are discharged per minute, that the speed of spinning is 40 metres per minute and that the setting bath contains 62 to 64 per cent of $H_2SO_4$.

(d) Mode of procedure as in (a), but with the difference that 3.3 ccm. of the spinning solution are discharged per minute, that the setting bath contains 65 to 67 per cent of $H_2SO_4$ and has a temperature of 0° C. and that the spinning nozzle has 54 perforations of 0.1 mm. diameter.

(e) Mode of procedure as in (a), but with the difference that 3 ccm. of the spinning solution are discharged per minute, that the nozzle contains 24 perforations of 0.1 mm. diameter, that the setting bath has a temperature of 0° C. and that the length of immersion of the threads in the bath is 80 cm.

(f) The process is conducted as in (a), but with the difference that the spinning solution is discharged at a speed of 14 ccm. per minute, that the speed of spinning is about 100 to 120 m. per minute and that no additional stretching is given to the thread.

V (a) to (l)

(a) The parent viscose is prepared as in Example I, but with the difference that as parent cellulose such a wood-pulp or cotton linters are used as yield viscose having a pronounced high viscosity, particularly when the viscose contains a somewhat low quantity of cellulose, for example less than 5 per cent and that, for the dissolving of the cellulose xanthate such a quantity of caustic soda and water is used as to yield a solution containing about 3 per cent of analytical determinable cellulose and about 5 per cent of NaOH, the viscosity of the viscose thus prepared being about 1 to 2 as compared with glycerine of about 31° Bé. (1.26 specific gravity).

Immediately after the dissolution of the cellulose xanthate, 60 parts of monochloracetic acid, dissolved in 60 parts of water and neutralized with sodium bicarbonate are added to the viscose and well stirred in, and the solution thus obtained is allowed to age at 15° C. During ageing the solution is filtered three times through cotton wool and, after it has attained a total age of 72 hours, it is spun as follows:—

The spinning solution is squirted at a speed of 3.7 ccm. per minute through a platinum nozzle (having 100 holes of 0.08 mm. diameter) into a bath containing 65 per cent of $H_2SO_4$ and having a temperature of 16° C., the length of immersion of the threads in the sulphuric acid being 80 cm. Then the threads are allowed to pass through the air for 120 cm. and wound on a bobbin revolving at such a speed as to produce a speed of spinning of about 18 m. per minute. In the air passage three glass rods are arranged angularly to one another, over which rods the thread runs, thus applying an additional stretch or tension to the thread. The lower part of the spool revolves in water, so that the sulphuric acid is removed or is considerably diluted as soon as the thread arrives at the spool. The threads are then washed, purified, twisted and finished in the usual manner.

The thread obtained in this manner consists of single filaments of about 0.6 to 0.8 denier.

(b) The mode of operation is the same as in (a) but with the difference that the temperature of the coagulating bath is 4° C.

(c) Mode of operation as in (a) or (b), but with the exception that the spinning bath contains 70 per cent of $H_2SO_4$.

(d) Mode of operation as in (a) or (b), but with the difference that the coagulating bath contains 60 per cent of $H_2SO_4$.

(e) The same mode of operation as in (a), or (b) or (c) or (d), but with the difference that 6.8 ccm. of the spinning solution are discharged per minute and that the speed of spinning is 30 m. per minute.

The titre of the single filaments is about 0.6 to 0.8 denier.

(f) Mode of procedure as in (a) or (b) or (c) or (d) but with the difference that the spinning solution is discharged at a speed of 14.3 ccm. per minute, and that the speed of spinning is about 40 m. per minute.

The titre of the silk is about 1 to 1.3 denier per single filament.

(g) Mode of procedure as in (a), or (b), or (c), or (d), but with the difference that the spinning nozzles have 54 perforations of 0.1 mm. diameter, and that the spinning solution is discharged at a speed of 7.6 ccm. per minute.

The titre of the individual filaments is about 2 to 2.6 deniers.

(h) Mode of procedure as in (g), but with the exception that the temperature of the setting bath is minus 5° C.

(i) Mode of procedure as in (a), or (b), or (c), or (d), but with the difference that the nozzles have 24 holes of 0.1 mm. diameter, and that the spinning solution is discharged at a speed of 6.8 ccm. per minute.

The titre of the single filaments is about 4 to 5 deniers.

(k) Mode of operation as in (i), but with the difference that the temperature of the setting bath is minus 5° C.

(l) The process is conducted as in (f), but with the difference that the spinning solution is discharged at a speed of about 30 ccm. per minute, that the speed of spinning is about 100 to 120 m. per minute, that the thread is not subjected to additional stretching and that the length of immersion is 80 to 100 cm.

VI (a) and (b)

(a) One of the spinning solutions produced according to any one of the foregoing prescriptions is spun in the known manner in one of the following baths:
  (1) In a solution of ammonium sulphate of 25 to 30 per cent strength,
  (2) In a bath consisting of 500 parts of sodium bisulphate, 76 parts of sulphuric acid of 66° Bé., and 587 parts of water, which bath may be kept at room temperature or at a raised temperature, for instance 50° C. or
  (3) In a bath consisting of 982 parts of water, 180 parts of sodium sulphate, 60 parts of ammonium sulphate, 15 parts of zinc sulphate, 135 parts of glucose and 128 parts of sulphuric acid of 66° Bé.

The coagulated thread is introduced from one of the baths cited into a bath of the following composition:
  (1) Sulphuric acid of 70 per cent of $H_2SO_4$ or
  (2) Sulphuric acid of 60 to 65 per cent of $H_2SO_4$ or
  (3) Sulphuric acid of 55 per cent of $H_2SO_4$ or
  (4) A solution of 13.3 parts of ammonium sulphate in 120 parts by weight of sulphuric acid of 62 to 70 per cent of $H_2SO_4$, to which 9 to 10 parts of sulphuric acid of 66° Bé. are added.

The temperature of the second bath may be kept below room temperature, for instance at 0 to 10° C., or at room temperature, or even above room temperature, for instance at 25° to 45° C.

The length of immersion of the thread in the second bath may be small, for instance 20 cm. or also large, for instance 30 to 120 cm. or more.

The threads are stretched by any one of the known methods, namely either in the second bath or after they have left it. This may be arranged by making the distance of the collecting device from the second setting bath very large, or by conducting the threads over one or several rods, hooks, rollers, or differential rollers, which are arranged between the nozzle and the collecting device in the second bath or outside it or at both places.

The threads are collected, while the sulphuric acid is removed or diluted by washing as has previously been described, and the threads are finally washed completely, dried and treated in the manner described in Example I.

(b) The process is conducted as in (a), with the difference that hydrochloric acid of 40 per cent strength is used for the second bath.

VII (a) to (e)

The process is conducted as in any one of the Examples I (a) to (e), but with the exception that instead of the 60 parts of monochloracetic acid, 60 parts of α-brombutyric acid are employed, the strength of the spinning acids being as follows:—

Spinning method (a) 68 to 70 per cent of $H_2SO_4$
Spinning method (b) 70 to 71 per cent of $H_2SO_4$
Spinning method (c) 71 to 72 per cent of $H_2SO_4$
Spinning method (d) 67 to 69 per cent of $H_2SO_4$

VIII (a) to (e)

The process is conducted as in any one of the Examples I (a) to (e), but with the difference that instead of the monochloracetic acid, 40 parts of α-brombutyric acid are employed.

The concentrations of the spinning baths are as in the Examples I (a) to (e).

IX (a) to (e)

The process is conducted as in any one of the Examples I (a) to (e), but with the difference that, instead of monochloracetic acid, 30 parts of dichloracetic acid are added to the viscose; the strengths of the spinning baths are as in Example VII (a) to (e). Dichloracetic acid used in this example is $Cl_2CH$—$COOH$, the acid radical of which is $Cl_2CHCOO$—. This is typical of dihalogen monocarboxylic fatty acids.

X (a) to (e)

The process is conducted as in any one of the Examples IV (a) to (e), but with the difference that instead of monochloracetic acid, 30 parts of dichloracetic acid are employed. The strengths of the spinning baths are as in Example VII (a) to (e).

It is necessary to ascertain the most suitable strength of the precipitating bath in each case by experiment.

According to the foregoing examples, artificial silk is obtained which has a dry tenacity of over 2 grams per denier, a wet tenacity of over 1.5 grams per denier and an extensibility of 7 per cent and more.

XI

A spinning solution made as described in any one of the preceding examples is caused to enter in known manner through a suitable funnel or slot into any one of the precipitating baths prescribed in the previous examples, and the coagulated band of film, after it has passed through the bath, is washed and dried in the known manner.

XII

Cotton fabric is impregnated, filled or coated several times in a suitable machine, such as a padding machine or back-filling machine or spreading machine, with a spinning solution made as described in any one of the preceding examples and mixed, if desired, with a filling material such as talc or China clay (for example 100–200 per cent calculated on the weight of the cellulose), or a dyestuff, or a pigment such as mica or soot, and then without drying, and in some cases in stretched condition, is passed through a bath which has the composition of any one of the coagulating liquids named in the preceding examples. The dressed or coated fabric is then washed and dried.

In the foregoing examples an alkali cellulose which has been ripened for a long or a short time may be used in the manufacture of the viscose.

In place of strong sulphuric acid (i. e. a sulphuric acid solution containing at least 35% of $H_2SO_4$) I may use as the plasticizing agent other mineral acid of appropriate strength, e. g. a solution of nitric acid containing about 60 to 90% of $HNO_3$ or a solution of phosphoric acid containing about 67.5 to 99% of $H_3PO_4$ or a solution of arsenic acid containing about 60 to 90% of $H_3AsO_4$. Mixtures of acids and salts can also be used such as a solution containing about 60% of $ZnCl_2$ and 4 to 6% of HCl, or in short any liquid which has a plasticizing effect on the artificial material, e. g. artificial thread.

In the foregoing examples, there may be used instead of monochloracetic acid, monobromacetic acid or monoiodoacetic acid and, instead of the halogen derivatives of the fatty acids employed in the foregoing examples halogen derivatives of another fatty acid or substituted fatty acid may be employed, such as, for example, α-chloropropionic acid, α-bromopropionic acid, α-chlorosuccinic acid, α-bromosuccinic acid or β-chlorolactic acid, all such materials being included in the term "halogen fatty acid" as used hereinafter. Also the term "halogen fatty acid compound" as used herein is intended to cover the acids themselves and the salts thereof. Monochloracetic acid is HCHClCOOH. Dichloracetic acid is $HCCl_2COOH$. The homologues of monochloracetic acid are RCHClCOOH, in which "R" represents "alkyl." The salts and esters of halogen fatty acids and the free acids themselves can be represented by the general formula

CHaRR'COOR", in which Ha represents a halogen element, R' represents a halogen element or hydrogen, R represents alkyl or hydrogen, and R" represents a metal or hydrogen or a hydrocarbon radical, and "the acid radical of a halogen fatty acid" is

CHaRR'COO.

The alkali cellulose employed in the foregoing examples for the production of the viscose, may be allowed to mature for a short or long time, for example for 24 to 72 hours at 15 or 20° C.

In this specification and claims the expression "halogen fatty acid", or "monohalogen fatty acid" includes, wherever the context permits, the chlor-, brom- and iodo-fatty acids themselves, their derivatives, (such as esters) and their salts, and especially the monochlor-, monobrom- and monoiodo-fatty acids themselves, their derivatives (such as esters) and their salts.

Although, according to general practice, the term "oxy" covers also "hydroxy", to avoid any misunderstanding, it is pointed out that in the specification and claims the term "oxy" is intended to cover "hydroxy" also. The term "halogen fatty acid compound" as used in the claims is intended to embrace the acids as such, the salts of such acids and the esters thereof.

What I claim is:—

1. A process of making artificial materials which comprises acting upon viscose with a halogen fatty acid, and thereafter forming the thus obtained product, in solution, into the shape of an artificial material, and acting upon the latter with an agent having a coagulating effect upon the shaped solution, and plasticizing the freshly coagulated material.

2. A process of making artificial materials which comprises acting upon viscose with a halogen fatty acid added in the condition of the free acid and acting upon the product while in the shape of an artificial material, with a medium containing a mineral acid having a plasticizing action equivalent to that of sulphuric acid of at least 35% strength.

3. A process which comprises acting upon viscose with a halogen fatty acid, producing an artificial material from the reaction product, and treating such artificial material with a plasticizing agent.

4. A process which comprises acting with a substance containing a halogen fatty acid radical upon a cellulosic compound containing a CSS-group, shaping the solution of the resulting reaction product into the form of an artificial material, coagulating the said product and plasticizing the same.

5. A process which comprises acting with a halogen fatty acid in the form of a salt thereof, upon a cellulosic compound containing a CSS-group, shaping the solution of the resulting reaction product into the form of an artificial material, coagulating the said product when so shaped and plasticizing the same.

6. A process which comprises acting with a halogen fatty acid in the form of an alkali salt thereof, upon a cellulosic compound containing a CSS-group, shaping the solution of the resulting reaction product into the form of an artificial material, coagulating the said product when so shaped and plasticizing the same.

7. A process which comprises acting with a halogen fatty acid in the form of the sodium salt thereof, upon a cellulosic compound containing a CSS-group, shaping the solution of the resulting reaction product into the form of an artificial material, coagulating the said product when so shaped and plasticizing the same.

8. A process which comprises acting with a halogen fatty acid in the form of an ester thereof, upon a cellulosic compound containing a CSS-group, shaping the solution of the resulting reaction product into the form of an artificial material, coagulating the said product when so shaped and plasticizing the same.

9. A process as in claim 1 in which the artificial material is subjected to a stretching during a part of the process after the commencement of the coagulation, such stretching being in addition to the stretching incidental to the normal formation of the artificial material.

10. Process as in claim 1, in which the halogen fatty acid is added in the form of a salt, and subjecting the artificial material to stretching during a part of the process after the commencement of the coagulation, such stretching being in addition to the stretching incidental to the normal formation of the artificial material.

11. In the manufacture of artificial materials from a soluble cellulose derivative containing a CSS-group, the steps of introducing an elasticizing group into the molecule of the said cellulose derivative by reacting thereon with a halogen fatty acid in the form of a salt, giving the so-treated cellulose derivative the form of an artificial material, and subjecting the latter to action of a coagulating and plasticizing agent.

12. In the manufacture of artificial materials from a soluble cellulose derivative containing a CSS-group, the steps of introducing an elasticizing group into the molecule of the said cellulose derivative by reacting thereon with a substance containing a halogen fatty acid radical, giving the so-treated cellulose derivative the form of an artificial material, and subjecting the latter to action of a coagulating and plasticizing agent.

13. In the manufacture of artificial materials from a soluble cellulose derivative containing a CSS-group, the steps of introducing an elasticizing group into the molecule of the said cellulose derivative by reacting thereon with a salt of a halogen fatty acid, giving the so-treated cellulose derivative the form of an artificial material, and subjecting the latter to action of a coagulating and plasticizing agent.

14. In the manufacture of artificial materials from a soluble cellulose derivative containing a CSS-group, the steps of introducing an elasticizing group into the molecule of the said cellulose derivative by reacting thereon with a halogen fatty acid, giving the so-treated cellulose derivative the form of an artificial material, and subjecting the latter to action of a coagulating and plasticizing agent.

15. In the process of claim 2, the step of checking the action of the mineral acid when the action thereof has progressed sufficiently, and before substantial injury to the artificial material.

16. A process of making artificial materials which comprises acting upon viscose with a halogen fatty acid in the form of a salt thereof, and thereafter causing the thus obtained product to enter through a suitably formed opening into a bath containing an agent having a coagulating effect upon the shaped solution, and plasticizing the coagulated material.

17. A process of making artificial materials which comprises acting upon viscose with an ester of a halogen fatty acid, and thereafter causing the thus obtained product to enter through a suitably formed opening into a bath containing an agent having a coagulating effect upon the shaped solution, and a plasticizing effect on the coagulated material.

18. A process of making artificial materials which comprises acting upon viscose with a halogen fatty acid compound, and thereafter forming the thus obtained product into the shape of an artificial material, and acting upon the latter first with an agent having a coagulating effect upon the shaped solution and thereafter with an agent having a plasticizing effect on the coagulated material.

19. A process of making artificial materials which comprises acting upon viscose with a halogen fatty acid added as such, and thereafter forming the thus obtained product into the shape of an artificial material, and acting upon the latter first with an agent having a coagulating effect upon the shaped solution and thereafter with an agent having a plasticizing effect on the coagulated material.

20. A process of making artificial materials which comprises acting upon viscose with a halogen fatty acid in the form of a salt thereof, and thereafter forming the thus obtained product into the shape of an artificial material, and acting upon the latter first with an agent having a coagulating effect upon the shaped solution and thereafter with an agent having a plasticizing effect on the coagulated material.

21. A process of making artificial materials which comprises acting upon viscose with a halogen fatty acid in the form of a salt thereof with an alkali metal, and thereafter forming the thus obtained product into the shape of an artificial material, and acting upon the latter first with an agent having a coagulating effect upon the shaped solution and thereafter with an agent having a plasticizing effect on the coagulated material.

22. A process of making artificial materials which comprises acting upon viscose with a halogen fatty acid in the form of an ester of such acid, and thereafter forming the thus obtained product into the shape of an artificial material, and acting upon the latter first with an agent having a coagulating effect upon the shaped solution and thereafter with an agent having a plasticizing effect on the coagulated material.

23. A process of making artificial materials which comprises acting upon viscose with a halogen fatty acid salt, and thereafter causing the thus obtained product to enter through an appropriately shaped opening into a bath containing a coagulating agent for such product to form a coagulated artificial material, and treating the said artificial material with an acid agent having a plasticizing effect on the coagulated material.

24. A process of making artificial materials which comprises acting upon viscose with a halogen fatty acid in the form of a salt thereof, and thereafter causing the thus obtained product to enter through a suitably formed opening into a bath containing an agent capable of coagulating the same in the form of an artificial material, and treating the latter with a plasticizing agent therefor.

25. A process of making artificial materials which comprises acting upon viscose with a halogen fatty acid in the form of a salt thereof with an alkali and thereafter causing the thus obtained product to enter through a suitably formed opening into a bath containing an agent capable of coagulating the same in the form of an artificial material, and treating the latter with a plasticizing agent therefor.

26. A process of claim 4 in which the plasticizing agent is sulphuric acid of at least 35% $H_2SO_4$.

27. The process of claim 4 in which the plasticizing agent is a mineral acid having a strength equivalent to sulphuric acid solution of at least 35% $H_2SO_4$.

28. The process of claim 1 in which the plasticizing action is effected in a bath which contains at least 35% of sulphuric acid and also contains salts.

29. The process of claim 1 in which the plasticizing action is effected in a bath which contains at least 35% of sulphuric acid and also contains dissolved carbohydrates.

30. A process of making artificial materials which comprises acting upon viscose with a halogen fatty acid added as such, and acting upon the product in the shape of an artificial material, with a mineral acid of a strength equivalent to sulphuric acid of at least 35% strength.

31. A process of making artificial materials which comprises acting upon viscose with a halogen fatty acid in the form of a salt, and acting upon the product in the shape of an artificial material, with a mineral acid of a strength equivalent to sulphuric acid of at least 35% strength.

32. A process of making artificial materials which comprises acting upon viscose with a halogen fatty acid in the form of an ester, and acting upon the product in the shape of an artificial material, with a mineral acid of a strength equivalent to sulphuric acid of at least 35% strength.

33. A process of making artificial materials which comprises acting upon viscose with a halogen fatty acid compound of an alkali and acting upon the product in the shape of an artificial material with sulphuric acid of at least 35% strength.

34. A process of making artificial materials which comprises acting upon viscose with a halogen fatty acid compound of an alkali and acting upon the product in the shape of an artificial material with a plasticizing agent therefor.

35. A process which comprises acting upon viscose with a mono-halogenated fatty acid salt of an alkali, producing an artificial material from the reaction product, and treating such artificial material with a plasticizing agent.

36. A process which comprises acting upon viscose with a halogen fatty acid in the form of an alkali metal salt, and producing an artificial material from the reaction product by continuously introducing a shaped stream of the same into a bath which has a coagulating effect on the shaped stream and a plasticizing effect on the freshly coagulated material thereby produced from said shaped stream.

37. A process which comprises acting upon viscose with a halogen fatty acid, producing an artificial material from the reaction product by continuously introducing a shaped stream of the same into a coagulating agent and acting upon such artificial material with a plasticizing agent.

38. A process which comprises acting upon viscose with a halogen fatty acid, introducing fine streams of such reaction product, in a liquid state, into a setting agent, to form a filament-like structure, and thereafter treating such structure with a plasticizing agent.

39. A process which comprises acting with a water-soluble material containing the acid radical of a halogen fatty acid upon a cellulosic compound containing a CSS-group, shaping the solution of the resulting reaction product into the form of an artificial material, subjecting such product to the action of an agent which is capable of precipitating viscose, and then plasticizing the resulting shaped material in an acid medium.

40. A process as in claim 11, in which the artificial material is subjected to a stretching during a part of the process after the commencement of the plasticizing treatment.

41. Process as in claim 1, in which the halogen derivative used is a chlorine derivative of a fatty acid.

42. As new products, the herein described artificial threads having a tenacity of substantially over 2 grams per denier, produced by the process of claim 1.

43. A process of making artificial materials which comprises acting upon viscose with a halogen fatty acid compound, and thereafter causing the thus obtained product to enter through a suitably formed opening into a bath containing an agent capable of coagulating the same in the form of an artificial material, and treating the latter with a plasticizing agent therefor.

44. A process which comprises reacting upon a xanthate of a cellulosic body with a reagent of the type formula $C_nH_{2n+1-y}X_yCOOR$, in which R includes hydrogen or a metal or an alcohol radical, and X is a halogen element and $y$ is an integer, and thereafter subjecting a solution of the resulting product, while having the shape of a desired artificial structure, to the action of a coagulating solution, and plasticizing the freshly coagulated artificial structure.

45. A process of making artificial materials which comprises acting upon viscose with a halogen fatty acid, and thereafter forming the thus obtained product, in solution, into the shape of an artificial material, and acting upon the latter with an agent having a coagulating effect upon the shaped solution, and a plasticizing effect on the freshly coagulated material.

46. A process of making artificial materials which comprises acting upon viscose with a halogen fatty acid in the form of a salt thereof, and thereafter causing the thus obtained product to enter through a suitably formed opening into a bath containing an agent having a coagulating effect upon the shaped solution, and a plasticizing effect upon the coagulated material.

47. A process which comprises reacting upon a xanthate of a cellulosic body with a reagent of the type formula $C_nH_{2n+1-y}X_yCOOR$, in which R, includes hydrogen or a metal or an alcohol radical, and X is a halogen element and $y$ is an integer, and thereafter subjecting a solution of the resulting product, while having the shape of a desired artificial structure, to the action of a bath which has a coagulating effect on the shaped solution and a plasticizing effect on the freshly coagulated artificial structure.

48. A process which comprises acting upon viscose with a halogen fatty acid, producing an artificial material from the reaction product by continuously introducing a shaped stream of the same into a bath which has a coagulating effect on the shaped stream and a plasticizing effect on the freshly coagulated material produced from said shaped stream.

LEON LILIENFELD.